United States Patent
Tsuda et al.

(10) Patent No.: US 7,159,394 B2
(45) Date of Patent: Jan. 9, 2007

(54) POWER STEERING SYSTEM

(75) Inventors: Hisashi Tsuda, Tokyo (JP); Hideyasu Ihira, Tokyo (JP); Tsunefumi Arita, Tokyo (JP); Naoto Shima, Tokyo (JP); Noboru Shimizu, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 14 days.

(21) Appl. No.: 11/158,331

(22) Filed: Jun. 22, 2005

(65) Prior Publication Data

US 2006/0000209 A1    Jan. 5, 2006

(30) Foreign Application Priority Data

Jul. 5, 2004    (JP) .............................. 2004-197600

(51) Int. Cl.
*B62D 5/07* (2006.01)
*B62D 6/00* (2006.01)

(52) U.S. Cl. ........................... 60/368; 701/41; 180/422

(58) Field of Classification Search ................. 60/368, 60/422; 180/422; 701/41, 42
See application file for complete search history.

(56) References Cited

U.S. PATENT DOCUMENTS 4,887,682 A * 12/1989 Drutchas et al. ............. 701/41

5,749,431 A    5/1998 Peterson
6,092,618 A *  7/2000 Collier-Hallman .......... 180/422

FOREIGN PATENT DOCUMENTS

EP    1 331 157      7/2003
JP    2001-163233    6/2001

\* cited by examiner

*Primary Examiner*—Thomas E. Lazo
(74) *Attorney, Agent, or Firm*—Rabin & Berdo, P.C.

(57) ABSTRACT

A steering speed-computing section (81) to differentiate a steering angle of a steering wheel from a steering angle sensor (18) to compute the steering speed signal, a low-pass filter (82) to cut high frequency components in the steering speed signal to output a correction steering speed signal, a switching section (87) to switch the cut-off frequency in the low-pass filter to be higher at the time of determining a high-speed steering condition, and a flow quantity-computing section (85) to compute a target flow quantity supplied to a power steering output section (8) based on the steering angle signal and the correction steering speed signal are provided to control a flow quantity of an operating oil supplied to the power steering output section (8) for the target flow quantity.

5 Claims, 3 Drawing Sheets

POWER STEERING SYSTEM

BACKGROUND OF THE INVENTION

1. Field of the Invention

The present invention relates to an improvement of a power steering system which is adapted to control a flow quantity of an operating oil introduced into a steering output section in accordance with driving conditions of a vehicle.

2. Description of Related Art

An example of this type of conventional power steering system has been disclosed in Japanese Unexamined Patent Publication No. 2001-163233A, which is provided with a pump driven by an engine to discharge an operating oil, and a flow control valve controlling a flow quantity QP of the operating oil introduced from the pump to the steering output section.

The flow control valve is provided with a solenoid valve controlled by a controller, and a spool valve to return a part of the operating oil toward a tank side in response to a differential pressure of the operating oil between after and before flowing through the solenoid valve where the flow control valve controls the flow quantity QP of the operating oil supplied to the steering output section. Controlling the flow quantity QP of the operating oil supplied to the steering output section to be close to a required target flow quantity QM prevents an extra operating oil from being supplied to the steering output section, thus reducing a loss in driving force of the pump.

The controller receives a signal of a steering angle θ from a steering angle sensor and a signal of a vehicle speed V from a vehicle speed sensor, calculates a steering speed ω by differentiating the steering angle θ, and estimates a required target flow quantity QM based on the steering angle θ, the steering speed ω, and the vehicle speed V, thereby to control operations of the flow control valve.

Since the controller is configured to estimate the target flow quantity QM without using a detected value of steering torque, a torque sensor for direct detection of the steering torque is not required, resultantly leading to reduction in the cost of the control system.

SUMMARY OF THE INVENTION

According to the conventional power steering system, the steering speed ω calculated from the steering angle θ is used for calculation of the target flow quantity QM, and therefore, ripple is generated in a signal wave of the steering speed ω due to the steering angle resolution detected by the steering angle sensor. When a steering wheel is turned slowly, an output fluctuation by the ripple is increased, and the fluctuation of the steering-assist force caused by the ripple possibly makes a driver feel uncomfortable.

As a countermeasure, there can be used a steering sensor with small output fluctuation or high resolution, but such a sensor will be more expensive.

Otherwise, it can be considered to introduce a signal of a steering speed ω through a low-pass filter, thereby to cut off high-frequency components due to the ripple included in the signal waveform for the output. However, if the output is produced by cutting off the high-frequency components generated in the signal waveform of the steering speed using the low-pass filter, there possibly occurs a problem of deteriorating control responsiveness due to the low filter gain at the time of a high-speed steering condition when the steering wheel is turned fast.

In view of the above, there exists a need for a power steering system which overcomes the above-mentioned problems in the related art. The present invention addresses this need in the related art as well as other needs, which will become apparent to those skilled in the art from this disclosure.

It is an object of the present invention to provide a power steering system, which can remove a ripple feeling without an increase in steering angle resolution of a steering angle sensor even when a steering wheel is turned slowly, and also increase control responsiveness when the steering wheel is turned fast.

These and other objects, features, aspects and advantages of the present invention will be become apparent to those skilled in the art from the following detailed description, which, taken in conjunction with the annexed drawings, discloses preferred embodiments of the present invention. In order to achieve above the objects the present invention provides a power steering system in a vehicle provided with a power steering output section that power-assists a steering operation of a steering wheel in accordance with a supply amount of an operating oil.

The power steering system comprises a steering angle sensor to detect a steering angle of the steering wheel, a steering speed-computing section to differentiate the detected steering angle of the steering wheel to compute a steering speed signal thereof, a low-pass filter to cut high-frequency components in the steering speed signal to output a correction steering speed signal, a high-speed steering-determining section to determine a high-speed steering condition based on the steering speed signal, a switching section to switch a cut-off frequency in the low-pass filter to be higher at the time of determining the high-speed steering condition, a flow quantity-computing section to compute a target flow quantity supplied to the power steering output section based on the steering angle signal and the correction steering speed signal, and a flow control section to control a flow quantity of the operating oil supplied to the power steering output section according to the target flow quantity.

BRIEF DESCRIPTION OF THE DRAWINGS

Preferred embodiments according to the invention will be explained below referring to the drawings, wherein.

DETAILED DESCRIPTION OF PREFERRED EMBODIMENT(S)

Selected preferred embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
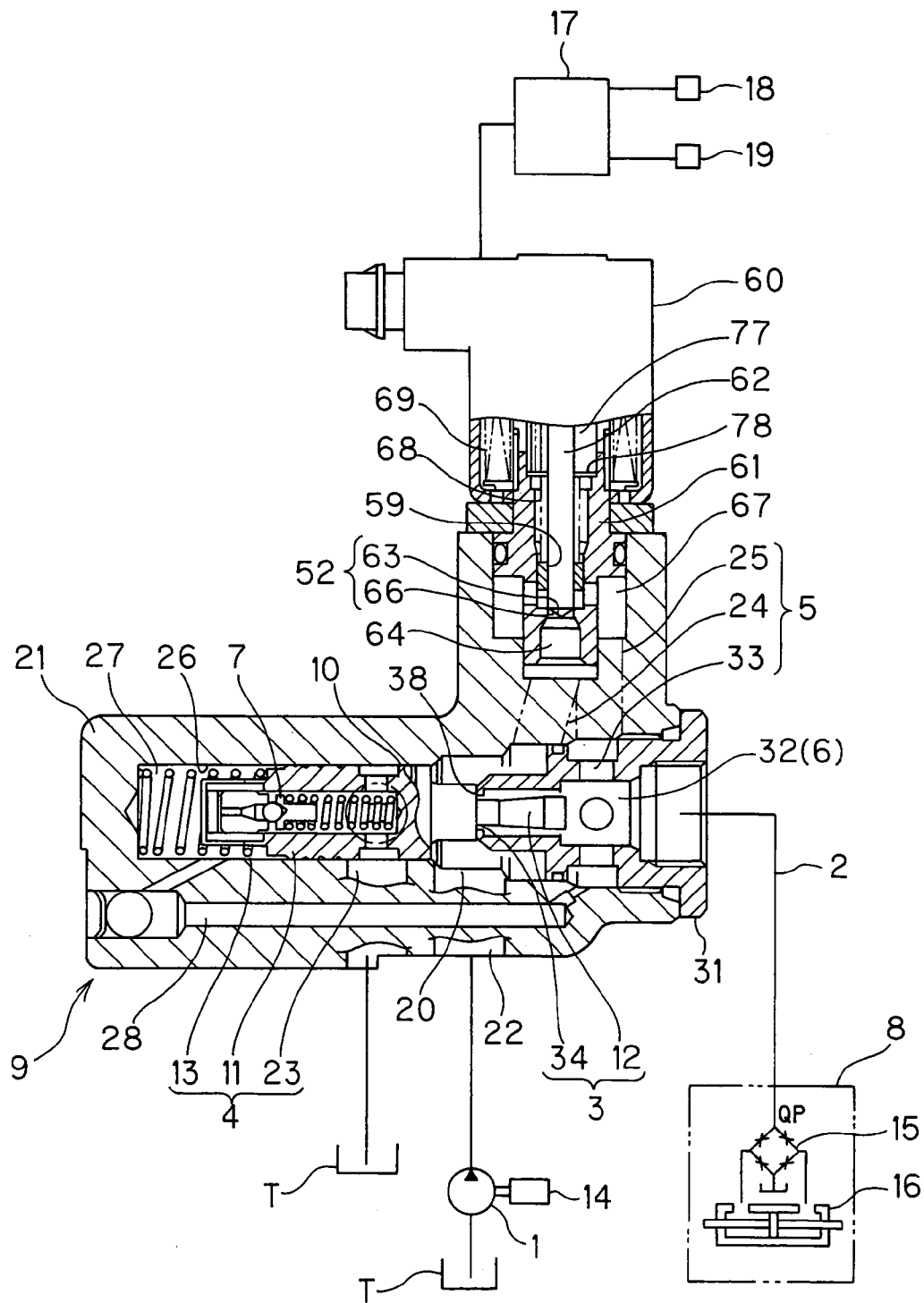
FIG. 1 is a system view showing a power steering system based on a first preferred embodiment of the present invention.

As shown in FIG. 1, a power steering system is provided with a pump 1 driven by an engine 14 installed in a vehicle, a flow control valve 9 controlling a flow quantity QP of an operating oil discharged from the pump 1, and a steering output section 8 operated by the operating oil supplied from the flow control valve 9.

The steering output section 8 is composed of a steering valve 15 switched by operation of a steering wheel (not shown), a power cylinder 16 power-assisting a steering mechanism in response to the supply of the operating oil controlled by the steering valve 15, and the like. The steering valve 15 switches depending on the turning direction of the steering wheel, and feeds the operating oil into either one of power cylinder chambers of the power cylinder 16, thereby providing a steering link connected to the power cylinder 16 with steering-assist force.

The flow control valve 9 is provided with a first supply channel 5 introducing the operating oil discharged from the pump 1 to the steering output section 8, and a solenoid valve 60 is interposed in the middle of the first supply channel 5 as a first variable orifice. There is also provided a second supply channel 6 branched from the middle of the first supply channel 5, bypassing the solenoid valve 60, and converging again with the first supply channel 5. In the second supply channel 6, a revolution-responsive orifice 3 is provided as a second variable orifice.

The flow control valve 9 is provided with a flow controlling section 4 returning a part of the operating oil from a supply channel 2 to a tank side corresponding to a difference in pressure between before the first variable orifice and after the second variable orifice, and a relief valve 7 relieving the operating oil to the tank side when a pressure upstream of the first and second variable orifices exceeds a specific value.

The flow control valve 9 is provided with a valve body 21 and a cap 31. A spool hole 26 in the valve body 21 receives a spool valve 11 slidably therein. The flow control valve 9 is also provided with a pump port 22 in communication with a discharging side of the pump 1, a return port 23 in communication with the tank side, and bypass ports 24, 25 defining the first supply channel 5. The cap 31 is formed of a supply port 34 defining a part of the second supply channel 6, a downstream chamber 32, a bypass port 33 defining a part of the first supply channel 5, and the like.

The spool valve 11 has a land section 10 formed at an outer periphery thereof so that, when the spool valve 11 moves to the left side in FIG. 1 against a spring 13, a tip of the land section 10 faces the return port 23 to communicate the pump port 22 with the return port 23, thus controlling the flow quantity of the operating oil returned from the pump port 22 to the return port 23 in accordance with a sliding position of the spool valve 11.

An upstream pilot pressure chamber 20 is defined at one end of the spool valve 11, and is located upstream of the first and second variable orifices. A downstream pilot pressure chamber 27 is defined at the other end of the spool valve 11 to receive the spring 13 and is communicated with a downstream side of the first and second variable orifices via a through hole 28.

In this way, the pressure before the first variable orifice and the pressure after the second variable orifice are respectively introduced to both ends of the spool valve 11, thereby moving the spool valve 11 to a position where the differential pressure is balanced with a spring force of the spring 13, so that a part of the operating oil is returned to the return port 23 to supply a required flow quantity to the power steering output section 8. Thus the spring 13, the spool valve 11, and the return port 23 define the flow controlling section 4.

The revolution-responsive orifice 3 as the second variable orifice is provided with the supply port 34, and a taper rod 12 changing an opening area of the supply port 34.

The taper rod 12 is connected to an end of the spool valve 11 to gradually reduce the opening area of the supply port 34 in a predetermined stroke area as the taper rod 12 moves together with the spool valve 11. When a revolution speed of the pump 1 driven by the engine 14 is increased to increase a discharge quantity from the pump, the pressure on the upstream side of the first and second variable orifices is increased to move the spool 11 back against the spring 13, whereby the operating oil recirculated back to the return port 23 is increased and the opening of the revolution-responsive orifice 3 is decreased at the same time.

When the pump 1 stops, the spool valve 11 is seated on an end face 38 of the cap 31 by an urging force of the spring 13. With this action, the return port 23 is closed by the land section 10 of the spool valve 11, the supply port 34 is closed, and the revolution-responsive orifice 3 is opened to the full.

The solenoid valve 60 is provided with a cylindrical housing 61 mounted by insertion into the valve body 21, and a shaft 62 slidably inserted into a shaft hole 59 on the side of the housing 61. The housing 61 is formed with an upstream chamber 64 communicated with the discharging side of the pump 1, a valve hole 66 into which a part of the shaft 62 is inserted, and a downstream chamber 67 communicated with the steering output section 8. The operating oil discharged from the pump 1 flows to the steering output section 8 through the upstream chamber 64, the valve hole 66, and the downstream chamber 67. The shaft 62 is driven by electromagnetic force generated in a coil 69 in the valve-opening direction (the upward direction in FIG. 1) against a spring 68.

The shaft 62 is formed with a cone-shaped valve section 63 at the tip thereof, which is inserted into the valve hole 66 to form the first variable orifice 52 as a circular gap between the two. The variable orifice 52 opens at a minimum when the coil 69 is in a non-excited state, and increasingly opens caused by the shaft 2 shifting in the upward direction in FIG. 1 as the exciting current increases.

On the other hand, in the solenoid valve 60, the valve section 63 is adapted to come slightly away from the valve hole 66 in a state where a core 77 is seated on a step section 78 in the housing 61, so that the first variable orifice 52, in other words, the first supply channel 5 is not opened to the full even when an electric current is not applied to the solenoid valve 60.

Hereby, even when a valve stick phenomenon occurs in such a manner that the spool valve 11 sticks to the valve body 21 or the cap 31, the operating oil flowing through the first variable orifice 52 is supplied to the steering output section 8 bypassing the revolution-responsive orifice 3. As a result, not only the steering-assist force by the steering output section 8 is obtained, but also an excessive load on the pump 1 is avoided, thus achieving the fail safe function.

When the pump 1 is driven by the engine 14 and the pressurized operating oil is supplied to the pump port 22, the pressure loss occurs due to the first and second variable orifices through which the operating oil flows, and as a result, the spool 11 moves against the spring 13 depending on the difference in pressure between the both pilot pressure chambers 20, 27 to determine openings of the pump port 22 and the return port 23 at the balance position, thus controlling the flow quantity QP of the operating oil supplied to the steering output section 8.

When the pump 1 revolves in a low speed range, the spool valve 11 does not shift due to the low differential pressure between the two chambers 20, 27 to close the flow controlling section 4 and the revolution-responsive orifice 3, thereby supplying the operating oil of the flow quantity QP proportional to the revolution speed of the pump 1 to the steering output section 8 through the solenoid valve 60.

When the revolution speed of the pump 1 is increased to an intermediate speed range, the pump discharge quantity increases, the differential pressure is increased in accordance with the increase in the pump discharge quantity, thereby shifting the spool valve 11 back against the spring 13. As a result, a part of the operating oil flown into the upstream pilot pressure chamber 20 is circulated into the return port 23, and the revolution-responsive orifice 3 opens so that the operating oil flows into the supply port 34. The spool valve 11 shifts more as the pump discharge quantity increases and therefore, the flow quantity QP of the operating oil supplied to the steering output section 8 through the solenoid valve 60 and the revolution-responsive orifice 3 is kept substantially constant.

When the revolution speed of the pump 1 is further increased, the taper rod 12 moves along with the spool valve 11 to gradually decrease the opening area of the supply port 34, or the opening area of the revolution-responsive orifice 3, and the flow quantity QP of the operating oil supplied to the steering output section 8 gradually decreases.

When the engine 14 revolves at high speeds, steering resistance in the vehicle is reduced, and the power-assist force required for the power steering output section 8 is also decreased. Therefore, in the range of high revolution speeds of the pump, the flow quantity QP of the operating oil supplied to the steering output section 8 is permitted to be small.

In turning the steering wheel greatly, or at a high speed, the steering torque increases where a target flow quantity of the operating oil required for the power steering output section 8 also increases. In this case, if the revolution speed of the pump does not change, the supply flow quantity of the operating oil does not change, either. When the steering torque thus increases, the flow quantity of the operating oil supplied to the steering output section 8 is increased by widening the opening of the first variable orifice 52 by the solenoid valve 60.

A controller 17 is provided in order to control the opening area of the first variable orifice 52, namely the opening of the solenoid valve 60 in accordance with the steering torque, namely the steering angle and the steering speed.

A signal of the steering angle $\theta$ from a steering angle sensor 18 and a signal of the vehicle speed V from a vehicle speed sensor 19 are inputted to the controller 17, based on which a target flow quantity QM required for the power steering output section 8 is estimated, based on which the opening of the solenoid valve 60 is controlled.

Figure 2:
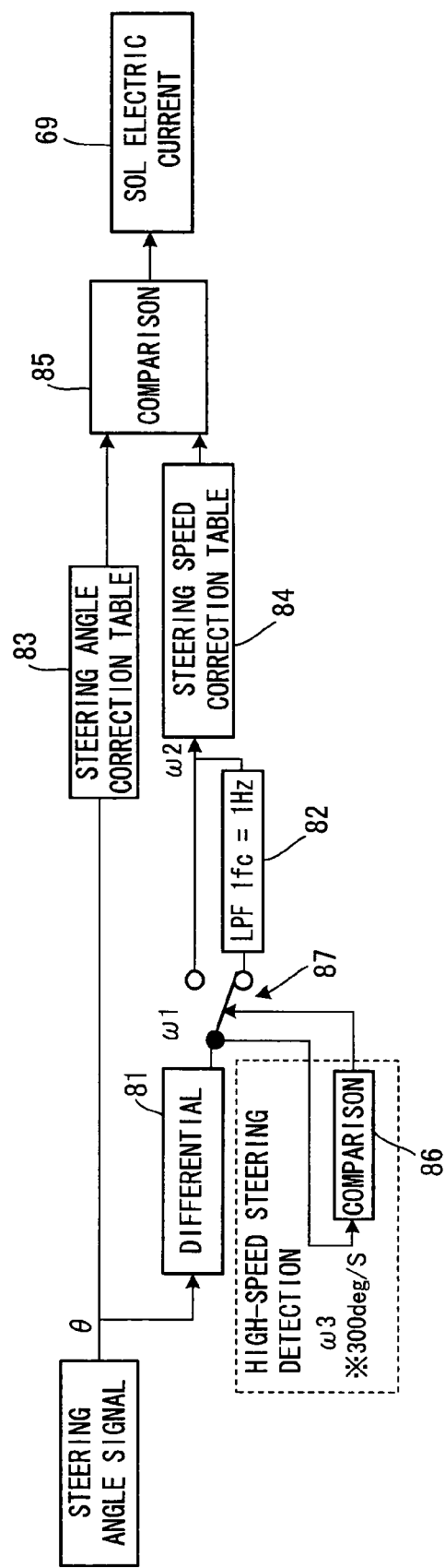
FIG. 2 is a block diagram showing a configuration of a controller based on the same.

As shown in FIG. 2, the controller 17 is provided with a steering speed-computing section 81 receiving a signal of the steering angle $\theta$ from the steering angle sensor 18 and computing a steering speed $\omega 1$ by differentiating the steering angle $\theta$ and a low-pass filter 82 receiving the steering speed $\omega 1$ and outputting a signal from which frequency components higher than a cut-off frequency fc are cut off as a corrected steering speed $\omega 2$.

The controller 17 is further provided with a steering angle correction table 83 computing a target flow quantity QM required for the power steering output section 8 based on the steering angle $\theta$ and the vehicle speed V at that time, a steering speed correction table 84 computing a target flow quantity QM based on the corrected steering speed $\omega 2$ and the vehicle speed V at that time, and a target flow quantity-computing section 85 comparing the target flow quantity QM computed from the table 83 and the target flow quantity QM computed from the table 84 to compute an exciting current of the coil 69 in the solenoid valve 60 based upon the larger value between them.

Ripple momentarily heightening the signal waveform occurs every time the steering angle $\theta$ exceeds the steering angle resolution of the steering angle sensor 18 in the steering speed $\omega 1$ computed by differentiating a steering angle $\theta$ computed by the steering angle sensor 18 in the steering speed-computing section 81. For instance, when the steering angle resolution of the steering angle $\theta$ detected by the steering sensor 18 is 1.5 deg. and the computing cycle of the steering speed $\omega 1$ is 10 ms, the steering speed $\omega 1$ is possibly computed as 150 deg/s. Otherwise, when the steering angle resolution of the steering angle $\theta$ detected by the steering angle sensor 18 is 2.5 deg. and the computing cycle of the steering speed $\omega 1$ is 10 ms, the steering speed $\omega 1$ is possibly computed as 250 deg/s.

The ripple thus generated in the signal waveform of the steering speed $\omega 1$ becomes relatively great under the condition where the steering wheel is operated extremely slowly, and the fluctuation of the controlled flow quantity of the operating oil controlled based on the same, namely the fluctuation of the steering-assist force, possibly makes a driver feel uncomfortable.

This is because, when the steering speed signal inputted into the steering speed correction table 84 fluctuates, the required target flow quantity QM computed based thereon also fluctuates.

The low-pass filter 82 receives a signal of the steering speed $\omega 1$ and outputs a signal from which frequency components higher than a cut-off frequency are cut off as the steering speed $\omega 2$. By setting the cut-off frequency fc as, for instance, 1 Hz, frequency components higher than 1 Hz included in the signal of the steering speed $\omega 1$ are cut off so that the steering speed $\omega 2$ can be outputted as the corrected steering speed $\omega 2$ equivalent to the steering speed $\omega 1$ without the ripple.

However, assuming the cut-off frequency fc of the low-pass filter 82 as, for instance, 1 Hz, since the frequency components higher than 1 Hz in the signal of the steering speed $\omega 1$ are cut off for the output, in a case where the steering wheel is operated at a high speed, the responsiveness of the signal of the steering speed $\omega 2$ to the steering wheel operation deteriorates, resulting in delaying the rise of the steering-assist force.

For this reason, the first preferred embodiment according to the present invention is provided with a high-speed steering-determining section 86 for detecting a high-speed steering condition when the steering speed $\omega 1$ is higher than a preset threshold value $\omega 3$, and a cut-off frequency-switching section 87 for increasing the cut-off frequency fc of the low-pass filter 82 at the time of the high speed steering condition.

The high-speed steering-determining section 86, for instance, compares the steering speed $\omega 1$ with the threshold value $\omega 3$ to determine a low speed steering condition when the steering speed $\omega 1$ is equal to the threshold value $\omega 3$ or less, and a high speed steering condition when the steering speed $\omega 1$ exceeds the threshold value $\omega 3$.

Provided that the steering angle resolution at which the steering angle sensor 18 detects the steering angle $\theta$ is X (deg) and the computing cycle of the steering speed $\omega 1$ in the steering speed-computing section 81 is Y (s), the threshold value $\omega 3$ is set at a higher value than X/Y (deg/s).

In a case the steering angle resolution of the steering angle sensor 18 is 1.5 deg or 2.5 deg, and a computing cycle of the steering speed ω1 is 10 ms, X/Y becomes 150 deg/s or 250 deg/s. In theses cases, in the first preferred embodiment the threshold value ω3 is set as, for example, 300 deg/s.

Since the threshold value ω3 is set at a higher value than X/Y (deg/s) in this way, when the steering wheel is operated at a low speed, the steering speed ω1 fluctuated by the steering angle resolution does not exceed the threshold value ω3, thus avoiding to erroneously determine the low speed steering condition as the high speed steering condition.

The cut-off frequency-switching section 87 inputs the signal of the steering speed ω1 in the low-pass filter 82 having the cut-off frequency fc as 1 Hz at the time of low or intermediate speed steering condition when the steering speed ω1 is equal to the threshold ω3 or less, and on the other hand, at the time of a high-speed steering condition when the steering speed ω1 exceeds the threshold ω3, directly inputs the signal of the steering speed ω1 in the steering speed correction table 84 without going through the low-pass filter 82.

In other words, the cut-off frequency-switching section 87 sets the cut-off frequency fc of the low-pass filter 82 to, for example, 1 Hz, at the time of the low or intermediate speed steering condition when the steering speed ω1 is equal to the threshold ω3 or less, and in the meantime, sets the cut-off frequency fc to an infinite value at the time of the high-speed steering condition when the steering speed ω1 exceeds the threshold ω3 to output the signal of the steering speed ω1 as the steering speed ω2 as it is.

Therefore, by setting the cut-off frequency fc to, for instance, 1 Hz at the time of the low or intermediate speed steering condition when the steering speed ω1 is equal to the threshold ω3 or less, the frequency components higher than 1 Hz included in the signal of the steering speed ω1 are cut off for the output, thus outputting the signal of the steering speed ω1 without the ripple. This prevents the fluctuation of the steering-assist force due to the signal waveform ripple caused by the steering angle resolution, thus preventing a driver from feeling uncomfortable with the ripple.

On the other hand, by outputting the signal of the steering speed ω1 as the steering speed ω2 as it is at the time of the high speed steering condition when the steering speed ω1 exceeds the threshold ω3, the responsiveness of the signal of the steering speed ω2 increases to the maximum, and the steering-assist force rises quickly under the condition where the steering wheel is operated quickly, resulting in the steering-assist force sufficiently secured.

Since at the time of the high speed steering condition, the steering speed ω1 is high and the ripple of the signal waveform caused by the steering angle resolution thereto becomes relatively small, there is no risk of making the driver feel uncomfortable with the ripple even if the signal of the steering speed ω1 is outputted as the steering speed ω2 as it is.

Thus, without improving the steering angle resolution of the steering angle sensor 18, the ripple under the condition where the steering wheel is operated slowly is eliminated, as well as the control responsiveness, namely the steering follow-up characteristic under the condition where he steering wheel is operated quickly is improved, so that a driver does not feel uncomfortable at any time regardless of speeds of the steering wheel operation.

Figure 3:
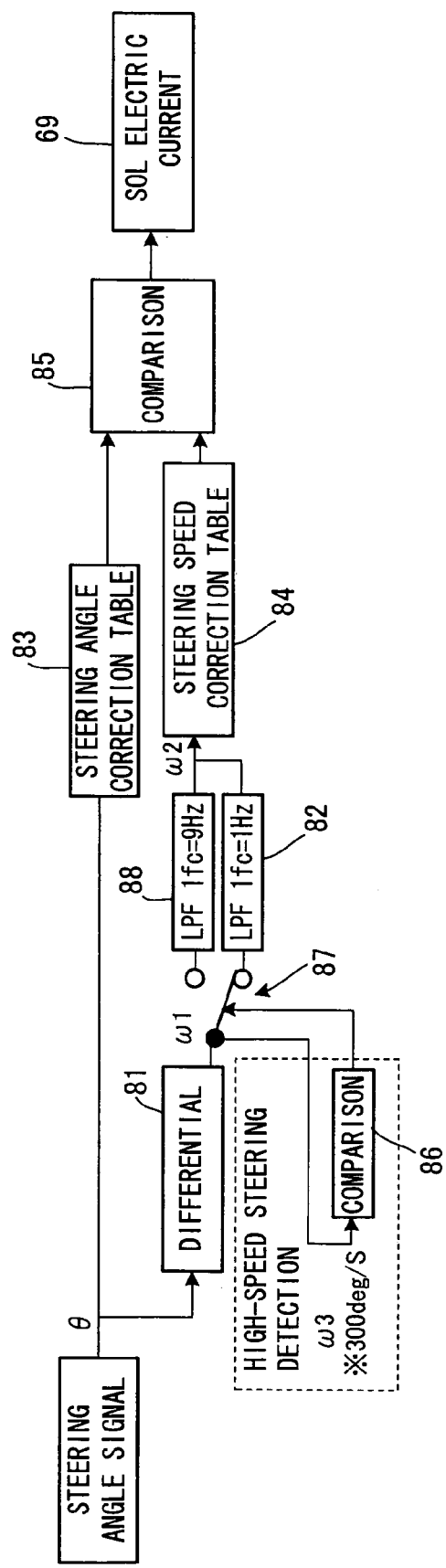
FIG. 3 is a block diagram showing a configuration of a controller based on a second preferred embodiment.

Next, with reference to FIG. 3, a second preferred embodiment will be described. Note that only differences from the first preferred embodiment will be described.

This preferred embodiment is provided with a first low-pass filter 82 having the cut-off frequency fc set to, for instance, 1 Hz, and a second low-pass filter 88 having the cut-off frequency fc set to, for instance, 9 Hz.

The cut-off frequency-switching section 87 inputs a signal of the steering speed ω1 in the first low-pass filter 82 at the time of a low or intermediate speed steering condition when the steering speed ω1 is equal to the threshold ω3 or less, and inputs a signal of the steering speed ω1 in the second low-pass filter 88 at the time of a high speed steering condition when the steering speed ω1 exceeds the threshold ω3.

In this case, by switching to the second low-pass filter 82 with the cut-off frequency as high as 9 Hz at the time of the high speed steering condition when the steering speed ω1 exceeds the threshold ω3, the responsiveness in the signal of the steering speed ω2 is improved, and the steering-assist force rises quickly under the condition where the steering wheel is operated quickly, resulting in the steering-assist force sufficiently secured. And since noises as frequency components higher than 9 Hz included in the signal of the steering speed ω1 are cut off, stability of the corrected steering speed signal ω2 is improved.

The present invention is not limited to the preferred embodiments described above, but it is apparent that various alterations can be made within the scope of the technical concept.

What is claimed is:

1. A power steering system in a vehicle provided with a power steering output section that power-assists a steering operation of a steering wheel in accordance with a supply amount of an operating oil, the system comprising:

a steering angle sensor to detect a steering angle of the steering wheel;

a steering speed-computing section to differentiate the detected steering angle of the steering wheel to compute a steering speed signal thereof;

a low-pass filter to cut high-frequency components in the steering speed signal to output a correction steering speed signal;

a high-speed steering-determining section to determine a high-speed steering condition based on the steering speed signal;

a switching section to switch a cut-off frequency in the low-pass filter to be higher at the time of determining the high-speed steering condition;

a flow quantity-computing section to compute a target flow quantity supplied to the power steering output section based on the steering angle signal and the correction steering speed signal; and a flow control section to control a flow quantity of the operating oil supplied to the power steering output section according to the target flow quantity.

2. The power steering system according to claim 1, wherein:

the switching section outputs the steering speed signal as the correction steering signal to the flow quantity-computing section without passing through the low-pass filter when the high-speed steering condition of the steering wheel is determined.

3. The power steering system according to claim 1, further comprising:

a second low-pass filter having a cut-off frequency higher than that of the first low-pass filter, wherein:

the switching section inputs the steering speed signal into the second low-pass filter when the high-speed steering condition is determined, and inputs the steering speed signal into the first low-pass filter except for the time when the high-speed steering condition is determined.

4. The power steering system according to claim 1, wherein:
the high-speed steering-determining section compares the steering speed signal with a preset value to determine the high-speed steering condition when the steering speed signal is equal to the preset value or higher.

5. The power steering system according to claim 4, wherein:
the high-speed steering-determining section sets the preset value to be equal to X/Y or higher, in assuming a steering angle resolution of the steering angle sensor as X and a computing cycle of the steering speed in the steering speed-computing section as Y.

* * * * *